United States Patent [19]

Brown et al.

[11] 4,095,425
[45] Jun. 20, 1978

[54] CONTROL SYSTEM FOR ROTARY AIR MODULATOR

[75] Inventors: Graydon L. Brown; Larry L. Newlin, both of Ponca City, Okla.

[73] Assignee: Continental Oil Company, Ponca City, Okla.

[21] Appl. No.: 773,926

[22] Filed: Mar. 3, 1977

[51] Int. Cl.² ............................................. F15B 11/20
[52] U.S. Cl. .................................... 60/484; 60/702; 60/DIG. 2; 340/17 R
[58] Field of Search ................ 60/390, 391, 407, 409, 60/426, 484, 701, 702, DIG. 2; 340/17 R

[56] References Cited

U.S. PATENT DOCUMENTS

| | | | |
|---|---|---|---|
| 2,742,763 | 4/1956 | Cohen | 60/390 X |
| 3,361,949 | 1/1968 | Brown et al. | 318/314 |
| 3,701,968 | 10/1972 | Broding | 340/17 R |
| 3,792,751 | 2/1974 | Fair | 340/17 R X |

Primary Examiner—Edgar W. Geoghegan
Attorney, Agent, or Firm—William J. Miller

[57] ABSTRACT

A control system for providing precise speed control for a rotary air modulator, and particularly for providing synchronized speed control as between two or more rotary air modulators. A common reference frequency is used for controlling rotational speed of one or more rotary air modulators wherein each modulator deploys an individual feedback system responsive to the reference frequency input to provide precise rotational speed and angular position coordination and, therefore, synchronism of frequency and phase output as between two or more individual modulators. The individual feedback systems include feedback and summation circuitry which derives angular velocity correction, angular position correction and hydraulic pressure drive variation for thereafter correcting and maintaining precise speed control of the rotary drive system.

23 Claims, 5 Drawing Figures

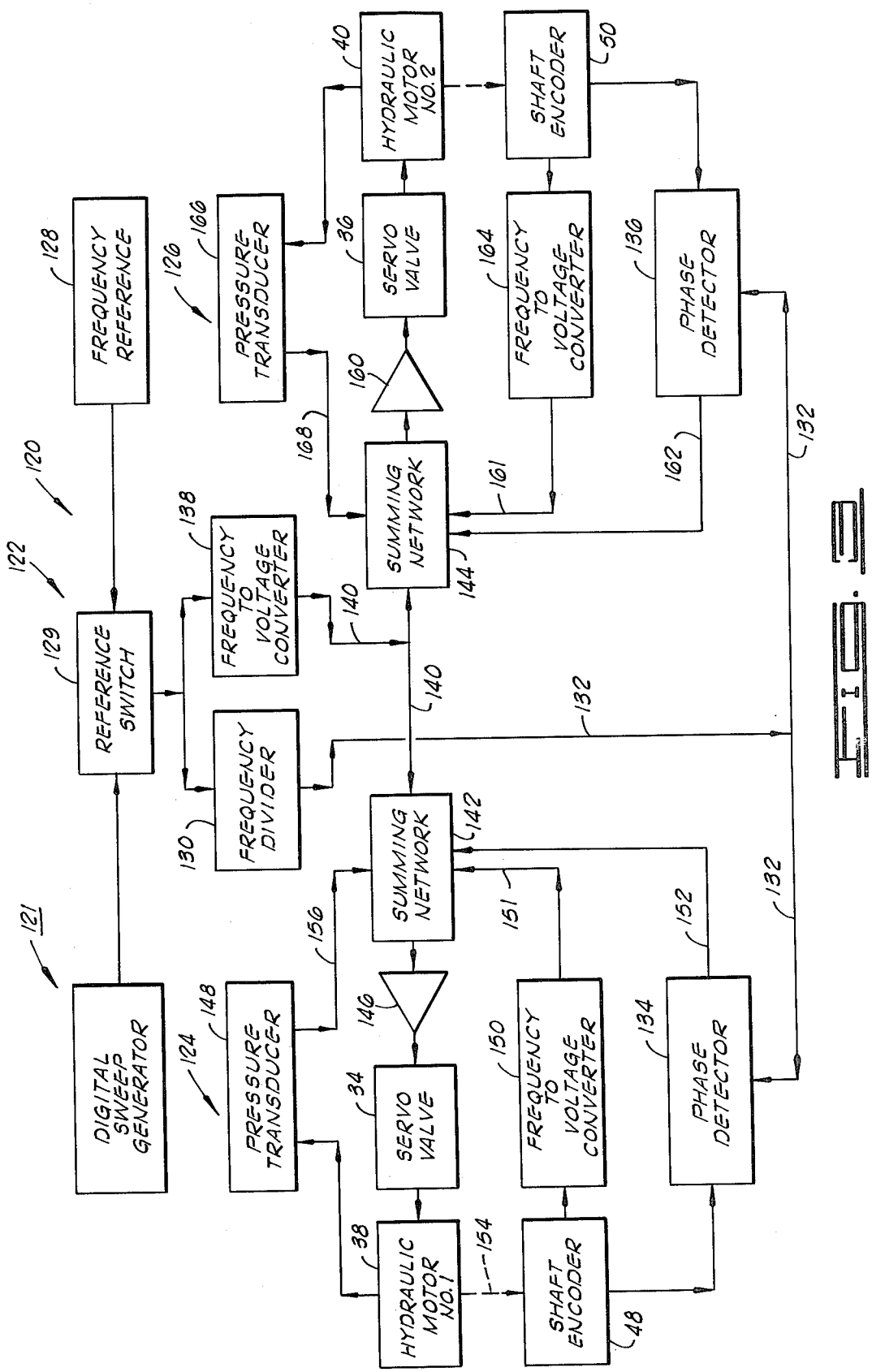

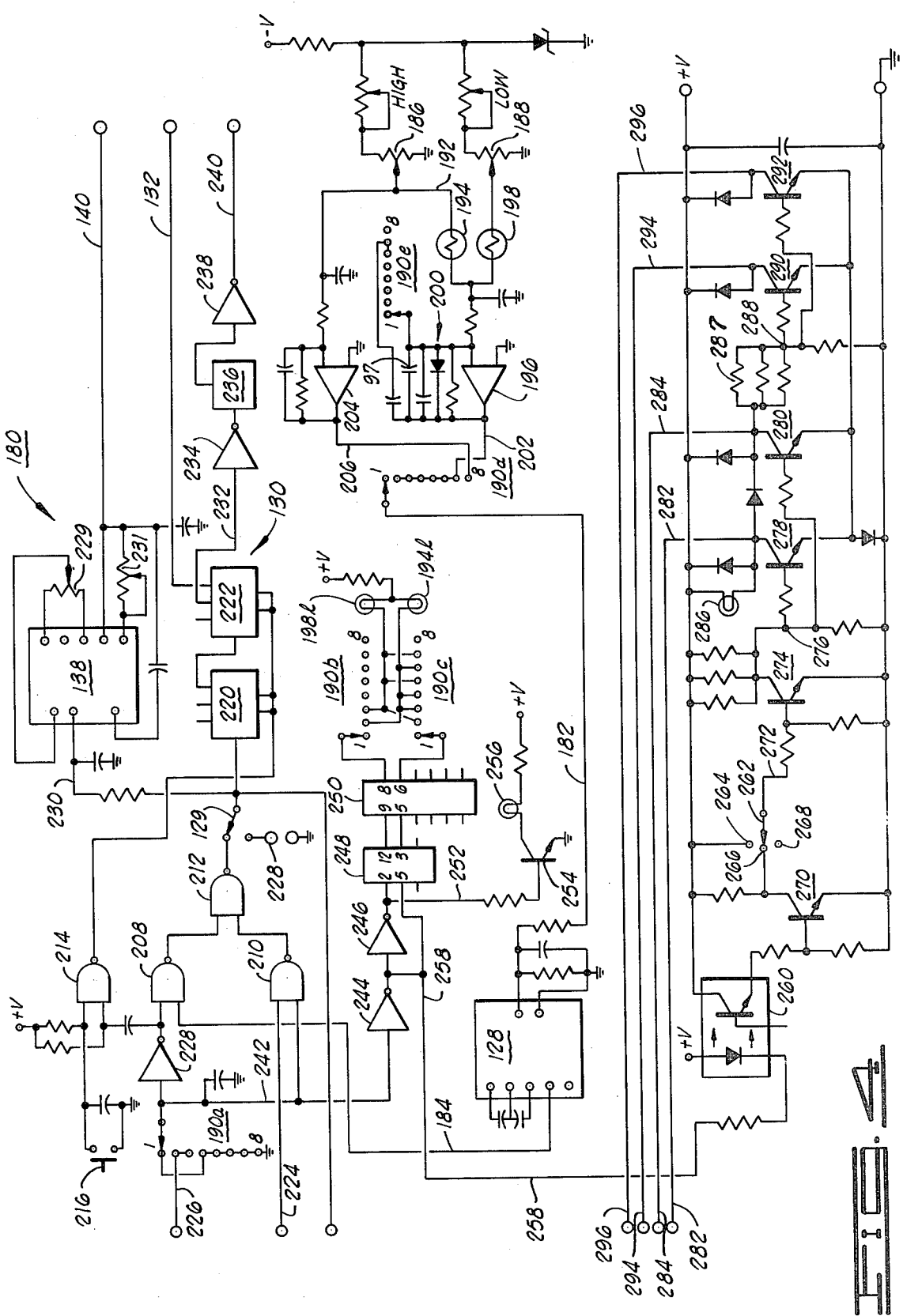

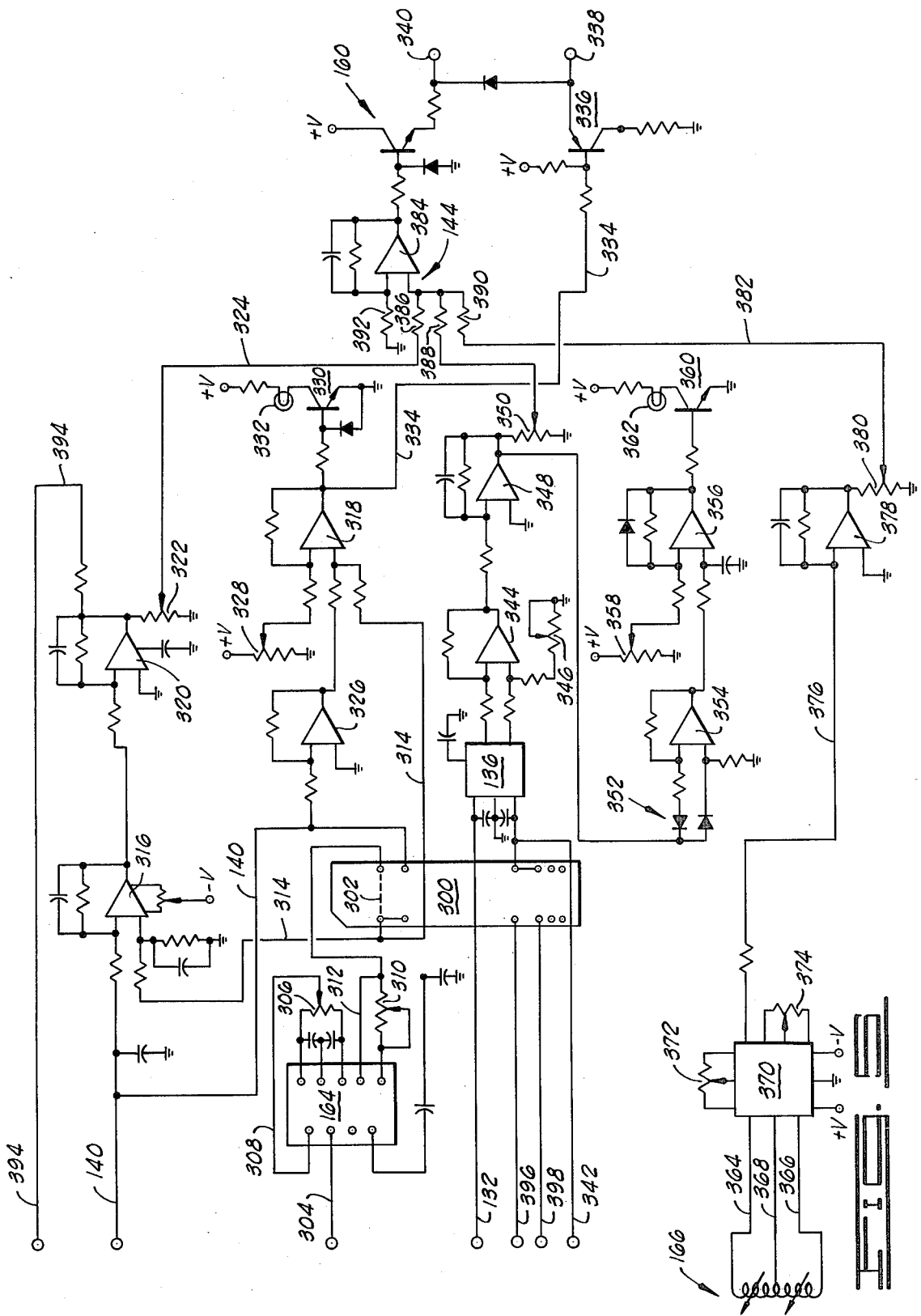

4,095,425

CONTROL SYSTEM FOR ROTARY AIR MODULATOR

BACKGROUND OF THE INVENTION

1. Field of the Invention

The invention relates generally to hydraulic motor control systems and, more particularly, but not by way of limitation, it relates to an improved control system for use in providing synchronous control of two or more hydraulically driven rotary air modulators.

2. Description of the Prior Art

While there are numerous prior forms of servo type control systems for use with hydraulically energized equipment, there is no known prior art which is directed to the present type of control and synchronism of hydraulically driven rotary air modulators. U.S. Pat. No. 3,361,949 in the name of Brown et al. may find consideration. This patent was directed to a motor control servo system for particular use with D-C motor driven magnetic tape drums, and similar feedback principles were utilized albeit that they co-acted in different manner to provide precise control of a different form of drive structure.

SUMMARY OF THE INVENTION

The present invention relates to a precise speed control system for utilization with one or more hydraulically driven rotary air modulators to enable output of seismic energy at selectively controlled frequency and phase relationship. The system includes a reference frequency source which is common to all modulator feedback systems, and each feedback system includes an encoder for providing velocity and phase feedback directly from the hydraulic motor for subsequent summation with the reference frequency source thereby to correct and provide input drive to the hydraulic motor. In addition, angular velocity variations due to friction and signal ripple are minimized by a pressure differential feedback system functioning in parallel with the velocity and phase feedback circuits.

BRIEF DESCRIPTION OF THE DRAWINGS

FIG. 3 is a block diagram of a control system for plural modulators as constructed in accordance with the present invention;

FIG. 4 is a schematic diagram of the frequency reference and sequence control circuitry of the present invention; and FIG. 5 is a schematic diagram of feedback circuitry in accordance with the present invention.

DETAILED DESCRIPTION OF THE PRESENT INVENTION

Figure 1:
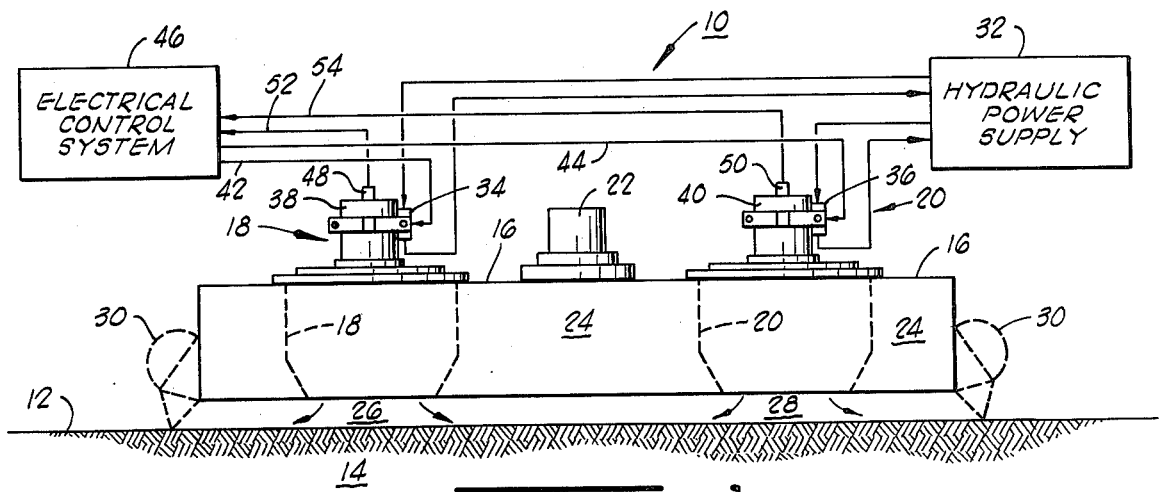
FIG. 1 is a side elevation in schematic form of an air cushion vehicle of the type which utilizes two rotary air modulators.

FIG. 1 illustrates an air cushion vehicle 10 of a type which is used as a seismic signal source for generation of seismic wave energy as coupled through earth surface 12 into earth medium 14. The air cushion vehicle 10 consists of a body or carrier 16 which includes a pair of rotary air modulators 18 and 20 disposed at opposite ends thereof. A fan compressor or air source 22 is shown centrally located on the carrier 16 to provide a predesignated constant air pressure to a plenum chamber 24 which extends throughout the confines of carrier 16. During operation, the rotary air modulators 18 and 20 are controlled to provide a modulated, alternating wave of air pressure within the respective air cushions 26 and 28 adjacent to earth surface 12. A perimetric side skirt 30 is affixed around the carrier 16 to provide continual, total envelopment of the air cushion area beneath carrier 16.

The rotary air modulators 18 and 20 are synchronously controlled, as will be further described below, utilizing a hydraulic power supply 32 which is connected to supply drive power to respective modulator servo valves 34 and 36 at respective hydraulic motors 38 and 40. The servo values 34 and 36 are synchronously controlled by means of conductors 42 and 44 leading from an electric control system 46. Feedback information from the respective hydraulic drive systems is provided by encoder sensors 48 and 50 as connected by respective conductors 52 and 54 back to electrical control system 46. Encoder sensors 48 and 50 are mounted to receive direct rotational input from the respective motors 38 and 40.

The carrier 16 is formed of plate metal or the like to form an amply large internal volume or plenum chamber 24 such that the total volume within carrier 16, except that volume occupied by rotary air modulators 18 and 20, forms the plenum chamber 24 thereby to provide a constant supply of air pressure for modulated air cushion formation. The precise form of hydraulic supply 32 may be any of various prior known types suitable for the purpose, and similar structure is discussed in the prior art U.S. Pat. No. 3,792,751 in the name of Delbert W. Fair, as assigned to the present assignee. The air source 22 is shown generally as being comprised of a high air flow, hydraulically driven fan which directs compressed air downward into plenum chamber 24.

Figure 2:
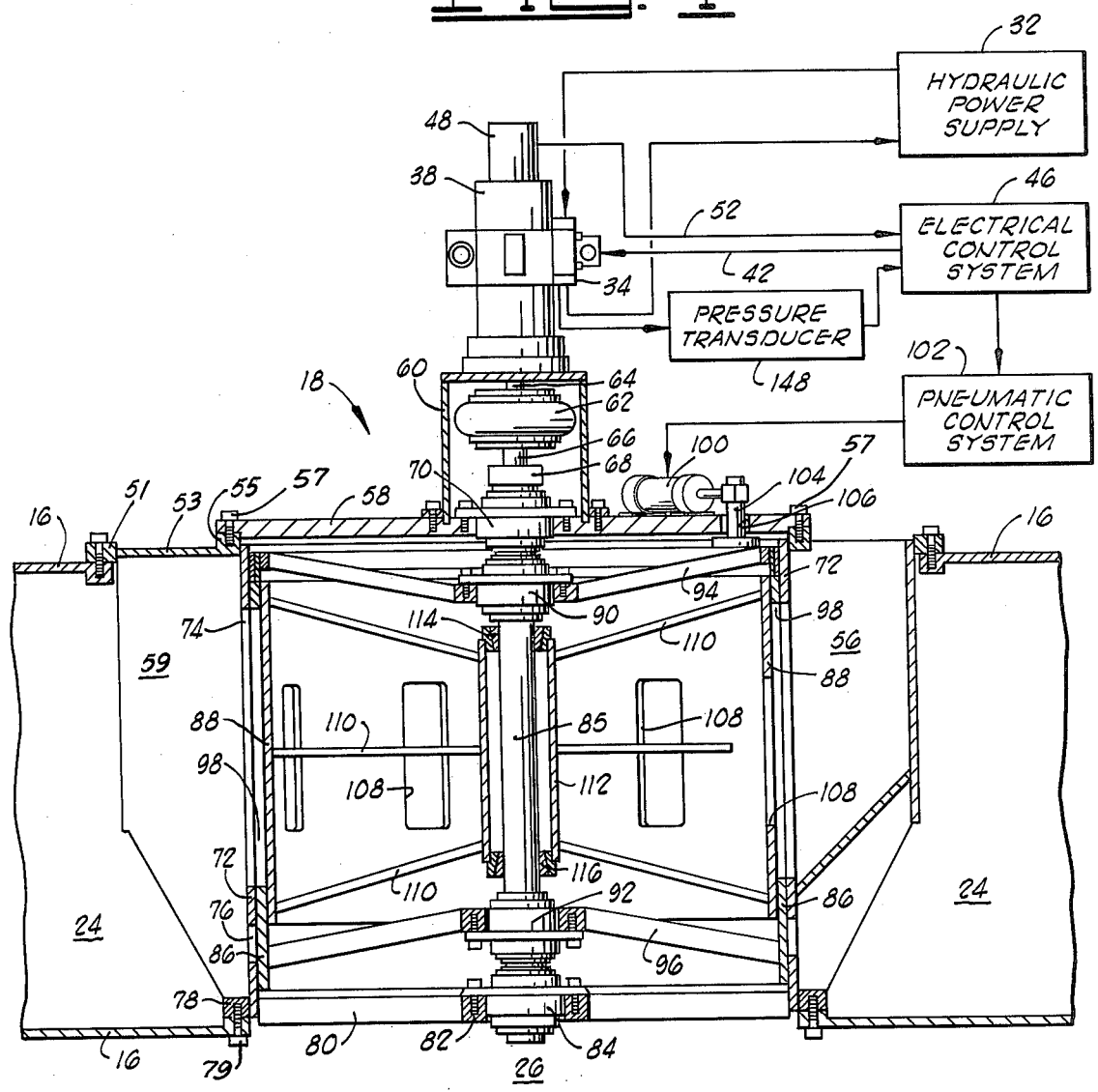
FIG. 2 is a vertical section illustrating one form of rotary air modulator which may be used in conjunction with the present invention.

FIG. 2 illustrates in greater detail the rotary air modulator 18 which is a type that may be utilized with the present invention. The rotary air modulator 18 is more particularly described in a patent application filed concurrently herewith, entitled "Rotary Air Modulator" as filed in the name of Delbert Fair. It should also be understood that other form of rotary air modulator, e.g., coactive disc type and other earlier versions, are susceptible of control with the present electrical control system. The rotary air modulator functions to control passage of air under compression from plenum chamber 24 into the air cushion 26 and, alternately, from air cushion 26 through exhaust ducts (to be described) to the external atmosphere. Stabilizers (not shown), as described in the aforementioned co-filed patent application, are generally utilized to provide stabilization and lateral positioning of the air cushion vehicle 10 during field use. However, during energy generation, i.e., air cushion formation, the vehicle 10 has flying capability at near surface distances and auxiliary air ports, as will be described, provide flying capability during non-modulation intervals.

As shown in FIG. 2, rotary air modulator 18 is rigidly secured within carrier 16 and surrounded by the internal volume of plenum chamber 24. Rotary air modulator 18 is primarily supported by a ring frame 51 adapted for bolt securing to the upper plate of carrier 16 and including the radial plates 53 leading inward into formation of a securing ring 55. The radial plates 53 are disposed in circumferential array and alternately intersticed with exhaust ports 56 around the modulator 18. A top plate 58 is then secured over securing ring 55 by means of a plurality of equi-spaced bolts 57 thereby to provide journal support for the hydraulic motor 38 and the rotary elements of rotary air modulator 18, as will be further described below. Ducts 59 provide the intake means for modulator 18.

A cylindrical housing 60 is securely affixed about the central axis of top plate 58 to provide seating for hydraulic motor 38 as well as housing space for a coupling 62 which transforms rotation from hydraulic output shaft 64 to a drive shaft 66, supporting collar 68 and axially mounted bearing assembly 70. The cylindrical stator member 72, is constructed to have a plurality of equi-spaced ports, alternate intake ports 74 and exhaust ports, (not shown), and a similar number of lesser area auxiliary ports 76 disposed therebelow. The lower periphery of stator 72 may be welded to a lower securing ring 78 which, in turn, is secured by bolts 79 or sealed by an elastomer sealant means within lower plating of carrier 16. A plurality of radial bars 80 are then secured between the lower extremity of the stator 72 and mounting hub 82 to which a bottom bearing assembly 84 is bolt-attached to provide lower rotational support for rotor shaft 85.

The bearing assemblies 70 and 84 may be selected from commercially available types, and the hydraulic motor 40 may be such as a servo motor Type, No. A084S276; M102CN241N2500 as is available from Moog Incorporated. Servo valve 34 may also be selected from commercially available types for coaction with hydraulic motor 40, e.g., the model 76M102 as manufactured by Moog Incorporated.

Rotationally mounted within cylindrical stator 72 are a cylindrical shutter 86 and, concentrically thereto, a rotor 88. The shutter 86 is supported in place by upper and lower bearing assemblies 90 and 92 which extend respective radially arrayed bars 94 and 96 outward for securing as by welding to shutter 86. Shutter 86 includes a plurality of equi-spaced ports 98, the same number and size as the ports 74 of stator 72. Shutter 86 can be rotated through an angle so limited that all stator ports 74 are alternately open or closed by the shutter 86 upon actuation of a pneumatic cylinder 100 as controlled by a pneumatic control system 102. The push rod of pneumatic cylinder 100 is rotationally coupled to a rod 104 extending downward through top plate actuation slot 106 for securing, as by welding, to the inner, upper periphery of shutter 86.

The rotor 88 is constructed, in this case, to have a plurality of ports 108 which are equi-spaced and half in number to those ports of shutter 86 and stator 72, and which are the same width but may be smaller in length than the shutter and stator ports. Rotor 88 is supported by a plurality of radial bars 110 which extend inward for affixure to a central, cylindrical axial sleeve 112 which is fixed through hub elements 114 and 116 to rotor shaft 85.

In one current design, the stator 72 includes sixteen equi-spaced ports of predetermined length and width, with similar port spacing and size in the shutter 86. The rotor 88 includes eight equi-spaced ports that are calculated to allow sufficient flow to modulate pressure up to full supply pressure and down to substantially atmospheric pressure. It should be kept in mind however, that the shape, size and number of ports may be varied considerably to achieve selected operational effects.

In operation, air at selected pressure from the plenum, chamber 24 is allowed to pass through intake ducts 59 and stator ports 74 when shutter 86 is shifted to its port-aligned or ON position as shown in FIG. 2. The air under pressure is then modulated by the rotating rotor 88 as it passes periodically through ports 108 and into the air cushion 26. As rotor 88 rotates, alternate ones of aligned ports 74 and 98 are blocked, i.e., those ports which are aligned with intake ducts 59; and, at this time, the rotor ports 108 will align with remaining ones of aligned ports 74 and 98 which lead to exhaust ducts 56. Thus, the air cushion 26 is modulated by plenum air input to the air cushion 26 alternated with exhaust air removal from air cushion 26 to the external atmosphere.

In a plural modulator system, the frequency and phase synchronization of rotary air modulators becomes extremely important in order that usable seismic energy input to the earth is effected. Thus, a control system such as that shown in FIG. 3 is utilized. FIG. 3 illustrates an electronic control system 120 which functions with a digital sweep generator 121, and which includes a common control standard or frequency reference 122 in coaction with individual drive/feedback systems 124 and 126, or more if a greater plurality of rotary air modulators are being utilized. While the illustration shows plural rotary air modulators, it should be understood that the present control system is fully as valuable for controlling a single modulator, i.e., one frequency reference and one coactive drive/feedback system.

Proceeding with discussion as regards a dual modulator system, control system 120 provides precise speed control capable of tracking continuously over a wide speed range. The system provides to each modulator a set of common reference frequencies which are then applied to each of two separate drive/feedback systems 124 and 126 to hold them at speed synchronization and within a small error of the same angle of rotation at any given time. Some of the primary concepts of a control system of this type are disclosed in U.S. Pat. No. 3,361,949, Brown et al., such teachings being applied in that instance to a drive control system for magnetic recording mechanism.

Control system 120 provides for each rotary air modulator a compound feedback system for controlling the individual drive speeds. The system provides for comparison of both an angular velocity reference and an angular position reference to maintain respective hydraulic drives of one, two or more rotary air modulators at exact velocity and position of angular rotation. At lower speeds, friction and ripple voltages in both the velocity and angular position feedback circuits tend to produce slightly more erratic movement of the hydraulic motor. This variation is further smoothed utilizing negative feedback indication from the differential pressure (torque or angular acceleration feedback) which drives the respective hydraulic motors. The use of the control system as disclosed allows the speed control range to vary continuously and smoothly over a relatively wide speed range of at least 20:1 with normal operating output frequencies of 3 Hz. to 60 Hz., e.g., this corresponds to modulator rotor shaft speeds from 22.5 rpm to 450 rpm in an existing system.

In FIG. 3, frequency reference 128 provides output of the basic timing signal. The frequency reference 128 may be such as a well-known form of variable oscillator which can be adjusted within limits consonant with the desired frequency of modulated air output. At the present, such control signal generators may take the form of highly accurate digital signal generators such as those which function to provide precise seismic generator control signals. Thus, frequency reference 128 provides an output signal through reference switch 129 to a frequency divider 130 which, in turn, provides output on lead 132 of a phase reference frequency. For the present discussion, frequency divider 130 may divide down at a 64:1 ratio, and the phase reference frequency on lead 132 is then applied in parallel to each of separate phase detectors 134 and 136. Output from the basic internal frequency reference 128 is also applied to a frequency to voltage converter 138 which provides an analog voltage output via lead 140 for input to each of the separate modulator summing networks 142 and 144.

Basic rotational speed is controlled by the analog velocity reference voltage on lead 140. That is, for hydraulic motor No. 1, velocity reference input to summing network 142 is altered by the various feedback routes to provide correct output through a D-C amplifier 146 to provide control of a servo valve 34 which then controls hydraulic motor 38 to drive at the desired rotational speed. The parallel feedback circuits are instituted through shaft encoder 48 and a pressure transducer 148 which is suitably connected to sense the hydraulic pressure at the motor input. The pressure transducer 148 may be such as the unit known as Differential Pressure Detector which is available from Validyne Engineering Corporation of Northridge, California. The shaft encoder 48 may be such as the Model 5V87BL which is available from Baldwin Electronics Company, Inc. of Little Rock, Arkansas.

Shaft encoder 48 provides dual outputs at distinctly different pulse rates, and applies a first high frequency output to frequency to voltage converter 150 which, in turn, provides an angular velocity feedback voltage via line 151 for input to summing network 142. A second integral submultiple frequency pulse output from shaft encoder 48 is applied to phase detector 134 along with phase reference frequency input on lead 132 to provide further analog correction voltage output to line 152 for feedback to summing network 142. The shaft encoder 48 is physically mounted on hydraulic motor 38 in sensing attitude, as shown by link 154, thereby to derive the hydraulic motor rotational sense outputs. The encoder 48 must (of course) be properly angularly oriented with respect to the modulator slots to achieve the desired control result.

Additionally, and for the purpose of combating ripple voltage variations and the like, torque or angular acceleration feedback is provided by the pressure transducer 148 which is connected to sense pressure variations in the drive line of hydraulic motor 38 thereby to generate an angular acceleration feedback voltage on lead 156 for input to summing network 142. The pressure feedback is essentially a measure of motor torque output and hence is proportional to angular acceleration. Acceleration feedback acts as a damping factor on dynamic system response without affecting static accuracy. Thus, the output from summing network 142 is the vector sum of the angular acceleration error voltage on lead 156, the angular velocity feedback voltage on lead 151, the phase error voltage on line 152, and the basic angular velocity reference voltage on lead 140. The summed network output is then applied through amplifier 146 and servo valve 34 to correctly drive hydraulic motor 38 at its designated angular velocity and angular position.

The drive/feedback system 126 for hydraulic motor 40 functions in identical manner from the same frequency reference 128 such that it is maintained in exact speed of rotation on time average, and with finite error of angular position throughout whatever the designated sweep of frequency. Thus, hydraulic motor 40 is driven under control of servo valve 36 and input amplifier 160 in accordance with the correction output from summing network 144. Alternatively, but not shown, motor 40 may be energized by a well-known form of variable displacement pump as controlled by servo valve 36. A similar form of shaft encoder 50 derives submultiple frequency output indication of actual hydraulic motor rotation for input to a phase detector 136, which then provides phase error voltage on a lead 162 for feedback to the summing network 144. The angular velocity feedback frequency output of shaft encoder 50 is applied through a frequency to voltage converter 164 for output of angular velocity feedback voltage via connection 161 to the summing network 144. Yet another pressure transducer 166 senses the hydraulic drive to hydraulic motor 40 in order to provide an acceleration error voltage output via line 168 to summing network 144, such that output to amplifier 160 is always an algebraically summed error output effected by feedback providing velocity error, phase error and drive pressure, or acceleration error.

Generally speaking, it will be desirable to controllably generate seismic energy frequencies in a low frequency range, e.g., from 3 Hz. to 60 Hz. In this event then, the variable oscillator frequency reference 128 should be controllable within that output frequency range which will generate such rotary air modulator output frequencies. By way of example, it will be assumed that the instantaneous output frequency of the rotary air modulators is 10 Hz. Thus, at this frequency of energy output, and dealing only with drive/feedback system 126, the phase frequency signal output from shaft encoder 50 to phase detector 136 must also be 10 Hz., and the velocity reference output from shaft encoder 50 to converter 164 will be 640 Hz.

In the particular case, we have discussed one form of rotary air modulator that is designed with eight slots which then produces an output frequency eight times the actual shaft speed so that the shaft speed is 10 divided by 8 which equals 1.25 revolutions per second for the modulator, the hydraulic motor 40, and the shaft encoder 50. The shaft encoder 50 phase output to phase detector 136 generates 8 pulses per revolution which, at 1.25 revolutions per second, is equal to 10 pulses per second. A second encoder 50 output to frequency to voltage converter 164 is generated at 512 pulses per revolution which, at 1.25 revolutions per second, is equal to 640 pulses per second. The encoder track of 8 pulses per revolution will correspond to the output openings or ports of the rotary air modulator so that the phase detector 136 output on lead 162 is a measure of the angular position error between the reference angle established by the phase reference frequency and the actual angle attained by the modulator rotor. The encoder 50 track of 512 pulses per revolution, as output to converter 164, will correspond to ⅛ of 512 or 64 times the output openings of the rotary air modulators, which is equal in output frequency to the velocity reference frequency as output from variable frequency reference 128.

FIG. 4 illustrates a sequence control system 180 which includes frequency reference circuitry 122 as well as other ancillary protection and control circuitry, as will be further described. The circuit is of modular integrated circuit construction and IC types will be noted. The internal frequency reference 128 is a standard form of voltage to frequency converter, Teledyne-Philbrick Type 4701, which receives enabling input via lead 182 to provide output on lead 184 at the requisite reference frequency. The limits and frequency range of frequency reference 128 are determined by HIGH potentiometer 186 and LOW potentiometer 188, as will be further described below. Operation of the sequence control circuit 180 is primarily controlled by a five section, eight position switch 190a–e which switches to operational positions as follows:

1 - OFF
2 - DIGITAL SWEEP UP
3 - DIGITAL SWEEP DOWN
4 - IDLE HIGH
5 - IDLE LOW
6 - MANUAL SWEEP UP
7 - MANUAL SWEEP DOWN
8 - STEADY STATE

HIGH potentiometer 186 is connected via lead 192 and a photoresistor 194 to the input of an operational amplifier 196, a Type 1458-CP1, while LOW potentiometer 188 is connected through a photoresistor 198 for similar input. Operational amplifier 196 is biased by network 200 to provide an up-down range voltage output on lead 202 to positions 2–7 of control switch 190d. Selected output from control switch 190d is then applied by lead 182 to the input of frequency reference 128 to enable reference output at the requisite sweep direction and rate of change. Lead 192 from HIGH potentiometer 186 is also connected to the input of an operational amplifier 204, Type 1458-CP1, which provides a steady state output on lead 206 to the No. 8 position of control switch 190d.

The voltage to frequency output from frequency reference 128 on lead 184 is applied to a logic network consisting of NAND gates 208, 210, 214 and 212. NAND gate 214 provides reset on actuation of push button switch 216. NAND gate 208 selectively conducts reference frequency pulses from lead 184 through NAND gate 212 to the Internal-External reference switch 129 (shown in Internal position) for input to series divide-by-eight counters 220 and 222 in the frequency divider 130. The NAND gates 208-214 are Type 7400, and the divide-by-eight counters 220 and 222 are each Type 7493.

Input from the digital sweep generator 121 (FIG. 3) is applied via lead 224 through NAND gate 210 as selectively enabled, and a digital sweep generator control output indicative of SWEEP TRUE is input at lead 226 to the No. 2 and No. 3. positions of control switch 190a. SWEEP TRUE input on lead 226 is switchable to provide input to an inverter 228, Type 7404, with output enabling NAND gates 208 and 214 to re-set counters 220 and 222. A selected external reference signal may be applied to switch 129 by means of receptacle 228.

Output from switch 218, in addition to being applied to counters 220 and 222, is applied via lead 230 to the input of frequency to voltage converter 138, Teledyne-Philbrick Type 4702, as utilized in standard configuration with zero adjust by potentiometer 229 and scale adjust 231. Output from converter 138 is via lead 140 (FIG. 3) which provides the angular velocity reference or frequency indicative D-C voltage, e.g., 64 millivolts per Hz., for control of feedback circuits. Output from counter 222 is on lead 132 which provides the phase reference frequency for application through individual phase detectors in selected feedback and control circuits. A second output from counter 222 on a lead 232 is applied through an inverter 234 (Type 7404), a divide-by-two stage 236 (Type 7493), and an inverter 238 (Type 7404), to provide output on lead 240 of a phase reference frequency with 90° lag for system tune up purposes.

SWEEP TRUE signal is also conducted from input 226 of inverter 228 via lead 242 for input to an inverter 244 in cascade with an inverter 246, each Type 7404, with further connection to a TTL-HTL translator 248, Type 666P. The translator 248 is then further connected to an open collector inverter 250, Type 681P, which functions in co-action with the wiper elements of respective control switches 190b and 190c. Output from inverter 246 via lead 252 is applied through an NPN common-emitter transistor 254 for selected energization of a lamp 256 which indicates DIGITAL SWEEP in operation.

Output from the amplifier 244 is further applied via lead 258 for input to a photoresponding electronic switch 260, Type 4N26, which provides automatic shutter control actuation. Shutter actuation is controlled by a shutter switch 262 having three positions for shutter CLOSED 264, shutter OPEN 266 and AUTOMATIC 268. With conduction of the transistor segment of switch 260, an NPN transistor 270 is caused to conduct such that voltage on lead 272 is driven toward battery ground and, as applied to the base of an NPN transistor 274, ceases conduction therethrough. This results in increased voltage at junction 276 and the base of parallel NPN transistors 278 and 280 such that the transistors conduct and provide output current flow via respective collector leads 282 and 284 to open the modulator shutters on each of two rotary air modulators. An indicator lamp 287 is illuminated to display shutter condition.

While the shutter is open, and transistors 278 and 280 are conductive, a substantially low voltage is conducted from the collector of transistor 280 through a resistor network 287 to a junction point 288 and, as applied to the base of respective NPN transistors 290 and 292, maintains the transistors cut off. Upon reversal, with the cut-off of transistor 270 and subsequent cut-off of transistor 280, where the command is to close the rotary air modulator shutters, the opposite occurs; that is, high positive voltage is applied to the base of transistor 274 to turn off transistors 278 and 280 with subsequent enabling of conduction of transistors 290 and 292 such that command voltage is output via respective collective leads 294 and 296 to close the rotary air modulator shutters. While the situation is shown for the control of first and second rotary air modulators, it should be understood that a greater plurality of air modulators can be controlled by simply compounding the transistor control stages.

Referring now to FIG. 5, the illustrated schematic diagram represents the feedback circuitry as may be associated with one of the controlled hydraulic motors, for example, hydraulic motor No. 2-40 of FIG. 3 (drive/feedback system 126). Where applicable, numeral designators from FIG. 3 appear with respect to the like component in FIG. 5; however, it should be understood that each of the drive/feedback circuits 124 and 126 of FIG. 3 are identical and function in the same manner to control their respective hydraulic motors 38 and 40.

The feedback circuitry is controlled by a plug-in block switch 300 which renders the system operative when placed in the upper position making switch connection as shown by dash line 302. The plug-in block (not shown) is placed in the lower half of switch 300 for testing and tune up periods, such operation not being germane to the present description.

Shaft encoder 50 (FIG. 3) provides output at 64 times output signal frequency, or eight times shaft rotation frequency, and is input at lead 304 to frequency to voltage converter 164, Teledyne-Philbrick Type 4702. Adjustment of offset voltage for zero frequency input is obtained by potentiometer 306 via control lead 308 and full scale output voltage on lead 312 is adjusted by potentiometer 310. Output from frequency to voltage converter 164 is taken on a lead 312 that is then applied through switch 300 to a lead 314 which applies the output in parallel to the input of a differential amplifier 316, Type 1458-CP2, as well as to input of a summing operational amplifier 318, Type 1458-CP1. The differential amplifier 316 compares the angular velocity feedback signal on line 314 to the angular velocity reference applied via lead 140 from the frequency to voltage converter 138 (FIG. 3). The output from amplifier 316, which is a measure of angular velocity error, is then applied to an integrator 320, Type 741, which applies output by means of a frequency (or angular velocity) gain potentiometer 322 and a lead 324 to the summing network 144.

The D-C reference voltage on lead 140 is also applied to an overspeed detector circuit comprised of inverter 326 and amplifier 318. Thus, reference voltage on lead 140 is applied to the input of the inverter 326, Type 1458-CP2, with output being summed with velocity feedback voltage on lead 314 for input to amplifier 318, Type 1458-CP1. Amplifier 318 also receives an adjustable D-C input from a potentiometer 328, the OVER-RUN THRESHOLD control. Output from amplifier 318, when in the overspeed condition, then energizes NPN transistor 330 to light the front panel warning lamp 332 indicating the overspeed condition. Output from amplifier 318 is also applied in parallel on lead 334 to the base of a PNP transistor 336 acting as a switch which opens in response to positive voltage, and opens the circuit to terminals 338 and 340 which energize the D-C torque motor (not shown) within servo valve 36.

Phase angle (or angular position) feedback is accomplished by comparing the phase reference frequency on lead 132 as input to the phase detector 136. Detector 136 also receives input from shaft encoder 50 of the lower frequency output of the encoder measuring shaft rotation (phase feedback) via lead 342 as input to detector 136, a Type MC4044. Phase detector 136 then provides dual outputs to a comparator amplifier 344, Type 1458-CP1, having a zero adjust potentiometer 346, and output from amplifier 344 is applied to an integrator 348, Type 741. Output from integrator 348 is then conducted through phase feedback gain (or angular position gain) potentiometer 350 to summing network 144. Further output from integrator 348 of a D-C analog voltage is applied in accordance with signal polarity through a diode network 352 for input to an out-of-phase detector consisting of inverting amplifier 354, Type 1458-CP1, in series with differential amplifier 356, Type 1458-CP1, having reference input from a threshold adjustment potentiometer 358. Output from amplifier 356 is applied to the base of a common-emitter NPN transistor 360 which is energized in response to positive base voltage to illuminate indicator lamp 362 thereby to show out-of-phase condition.

In pressure transducer 166 (FIG. 5), carrier inputs are supplied via leads 364 and 366 to two elements of an inductive bridge whose center tap 368 serves as feedback input to the bridge demodulator designated as Differential Pressure Detector 370, Validyne Type CD101-6-842, and adjunct component of the pressure transducer assembly. Detector 370 includes a span adjust potentiometer 372 and pressure zero potentiometer 374 while providing output signal via lead 376 for input to an integrator 378, Type 741. Output from integrator 378 is through a pressure feedback (or angular acceleration) gain potentiometer 380 and lead 382 for input to summing network 144.

Summing network 144 consists of a mixer amplifier 384, Type 741, having summing resistors 386, 388 and 390 receiving D-C data input in parallel. The summing resistors 386, 388 and 390, as presently utilized, have values of 68k, 39k and 390k, respectively; and provide algebraically summed output of frequency error, phase error, and differential pressure error D-C values. The inverting input is used to set stage gain by means of a ground-connected 2.2k resistor 392. Summed output from mixer 384 is then applied to the base of an NPN transistor amplifier 160 to control conduction therethrough. The emitter of amplifier 160 is connected to torque motor terminal 340 within servo valve 36 thereby to render operative rotational position of the torque motor for angular velocity control of hydraulic motor 40 (FIG. 3).

An output 394 from frequency loop integrator 320 provides a frequency error output which it utilized at the control console for determination and readout of any variation from the designated frequency output. Other supervisory and control circuits are also utilized to indicate phase error as between phase reference and phase feedback signals or as between two or more separate rotary air modulators, as well as for other ancillary control functions. The leads 396 and 398 conduct phase feedback and phase reference 90° lagging, respectively, as may be utilized during the test and set-up periods.

For operational discussion relative to the sequence control system 180 (FIG. 4), it will be assumed that the desired output sweep is one which is linear with time for the frequency of 20 Hz. to 5 Hz. over a period of 15 seconds. Thus, the control switch 190 would be set at DIGITAL SWEEP DOWN (position 3), such that control switch section 190c connects lamp 194*l* to output No. 6 of the inverter 250 thereby energizing lamp 194*l*. The lamp 194*l* causes photoresistor 194 to become low resistance and connects the output of the HIGH potentiometer 186 to the input of operational amplifier 196, while the high resistance of photoresistor 198 serves to disconnect the LOW potentiometer 188 from the amplifier input. The HIGH potentiometer 186 is pre-set to a designated value to produce an output frequency from the voltage to frequency converter 128 at a preselected frequency value. For example, voltage to frequency reference 128 may be set to provide 20 times 64 to 1280 Hz. in order that the rotary air modulator will run at the same velocity as the beginning frequency of the sweep would require. This signal from converter 128 on lead 184 is then gated through logic gates 208 and 212, and through reference switch 218 for input to both the reference frequency to voltage converter 138 and the series connected 8:1 dividers 220 and 222 to produce the phase reference frequency.

During the same period, the SWEEP TRUE signal on lead 226 from the digital sweep generator 121 (FIG. 3) will be low. The signal on lead 226 is applied via lead 242 through the inverter 244 as the shutter control signal and it functions to hold the shutter section of the respective rotary air modulators closed. Hence, even though the respective modulator rotors are turning at a speed to produce an output frequency of 20 Hz., the respective shutters prevent air from flowing through the rotor/stator sections, and prevent any output to the air cushion. This condition continues until either a coded signal or a manual command starts the digital sweep generator 121.

When the sweep generator 121 is triggered to start the sweep, the SWEEP TRUE signal on lead 226 goes high commanding opening of the shutters to allow air flow through the rotary air modulators. The NAND logic gates are then switched by the SWEEP TRUE signal to gate the 1280 Hz. signal from the sweep generator 121 to the reference frequency to voltage converter 138, as well as the two cascaded 8:1 dividers 220 and 222 thereby to provide the phase reference signal. There is a brief transient period during which the modulator control system changes from the approximate speed established by the internal reference oscillator, voltage to frequency converter 128, to the exact speed as established by the digital sweep generator 121 (FIG. 3). After this transient period, the servo will lock on and track the digital sweep generator 121 to maintain each one of the plurality of rotary air modulators to precisely the same angular velocity and angular position.

The digital sweep generator 121 output frequency, in terms of signal output frequency, is changing at a rate of 1 Hz. per second. Thus, five seconds after the start of the sweep, the output frequency is at 15 Hz., after 10 seconds at 10 Hz., and after 15 seconds it is at the end of the frequency or 5 Hz. Once locked on to the frequency and phase of the digital sweep generator 121, the control system tracks the linearly changing frequency of the sweep generator 121 until the end of the sweep.

During the sweep, the SWEEP TRUE signal on lead 226 will have switched inverter 250 so that the lamp 198*l* is energized to make photoresistor 198 low resistance and photoresistor 194 high resistance and the LOW potentiometer 188 supplies voltage to operational amplifier 196. The LOW potentiometer 188 is set at a precalibrated designation which would correspond to the sweep frequency end of 5 Hz. so that the voltage to frequency converter 128 has an output frequency near the ending frequency of the sweep generator. Where the sweep ends, the SWEEP TRUE signal on lead 226 goes low to cause (1) closing of the shutter to stop modulator output; (2) switching from digital sweep generator reference back to the internal reference from converter 128; and (3) switching from the LOW potentiometer 188 to the HIGH potentiometer 186 to await next sweep commencement. The moment that the sweep ends, the voltage to frequency converter 128 will maintain the rotary air modulator speeds at approximately the same speed for a brief period; but the changeover of lamp power to photoresistor 194 will delay slightly the changeover to the HIGH potentiometer 186 in the transition. An integrating capacitor 97 around the operational amplifier 196 acts to provide the nearly linear frequency ramp from the 5 Hz. ending frequency upward to be ready to start the new sweep at the start frequency of 20 Hz. The ramp voltage leading up to re-set occurs over a period of about 5 seconds which has been chosen to minimize the time required for locking on to a next ensuing downsweep.

While the present discussion refers to a frequency down sweep, because this is commonly used in some forms of vibrational prospection operation, the control system of the present invention can be used equally well with an up sweep, steady state or manual command. Also, while the general description refers to a servo-valve controlled hydraulic motor, it is contemplated that high power applications may best utilize a servo-valve controlled variable displacement pump operating in coaction with a hydraulic motor. The control system may be used equally well to control a rotary system driven by an electric motor. In this case, the pressure transducer is replaced by current sensing means responsive to the applied drive current to the motor to derive angular acceleration feedback.

The foregoing discloses a circuit for timing and control of one or a plurality of rotary air modulators. The application of common phase reference (or angular position) and frequency reference (or angular velocity) signals to two or more rotary air modulator control sections will cause the respective outputs to be locked in phase to the reference and, hence, to one another from only a small steady state phase (or angular position) error. It is contemplated that, through usage of a reference control system as disclosed, some large production models may require the use of four or more modulators in a single vibrator assembly or air cushion vehicle, and the plurality could be synchronized by using the common reference generator teachings as disclosed herein. Multiple vibrator assemblies, i.e., plural air cushion vehicles, may still be further synchronized by using independent digital sweep generators which have sufficient timing accuracy to generate reference signals in phase when started by a coded start signal as controlled from a central installation.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Circuit apparatus for controlling angular velocity and position of a motor driven rotary element which includes a servo amplifier controlling said motor, comprising:

means generating a reference frequency signal, and producing a first output which is an equivalent voltage thereof and a second output which is an integral sub-multiple frequency signal thereof;

means responsive to said motor driven rotary element for producing a first feedback signal at said reference frequency and a second feedback signal at said integral sub-multiple frequency;

means converting said first feedback signal to an equivalent second voltage;

phase detector means receiving input of said second output and second feedback signal to produce a phase difference voltage; and summing means receiving said first output, said second voltage and said phase difference voltage to produce an algebraically summed voltage which is applied to energize said servo amplifier in control of said motor.

2. Circuit apparatus as set forth in claim 1 wherein said means generating a reference frequency signal includes:
   a variable frequency oscillator generating said reference frequency signal;
   a frequency to voltage converter producing said first output; and
   a frequency divider producing said second output.

3. Circuit apparatus as set forth in claim 1 wherein said means responsive to said motor driven rotary element comprises:
   shaft encoder means receiving rotation in synchronism with said rotary element and producing said first and second feedback signals.

4. Circuit apparatus as set forth in claim 2 wherein said means responsive to said motor driven rotary element comprises:
   shaft encoder means receiving rotation in synchronism with said rotary element and producing said first and second feedback signals.

5. Circuit apparatus as set forth in claim 1 which is further characterized in that:
   said motor is a hydraulic motor driven in response to a hydraulic drive system with servo valve control.

6. Circuit apparatus as set forth in claim 5 which further includes:
   pressure transducer means sensing pressure fluctuations in said hydraulic system to generate a correction voltage for further input and summation in said summing means.

7. Circuit apparatus as set forth in claim 5 wherein said means responsive to said motor driven rotary element comprises:
   shaft encoder means receiving rotation in synchronism with said rotary element and producing said first and second feedback signals.

8. Circuit apparatus as set forth in claim 1 wherein:
   said reference frequency is an integral multiple of the motor driven rotary element angular velocity in revolutions per minute.

9. Circuit apparatus as set forth in claim 8 wherein:
   said reference frequency is eight times the rotary element angular velocity in revolutions per minute, and said second output integral sub-multiple frequency signal is one-eighth times said rotary element angular velocity in revolutions per minute.

10. Circuit apparatus for controlling and synchronizing angular velocity and angular position of plural motors driving rotary air modulation elements, each of which includes a servo amplifier controlling a respective motor, comprising:
    means generating a reference frequency signal, and producing a first output which is an equivalent voltage thereof and a second output which is an integral sub-multiple frequency signal thereof;
    plural means each responsive to a respective one of said motor driven rotary air modulation elements for producing a respective first feedback signal at said reference frequency and a respective second feedback signal at said integral sub-multiple frequency;
    plural means each converting a respective first feedback signal to a respective equivalent second voltage;
    plural phase detector means each receiving input of said second output and a respective second feedback signal to produce a respective phase difference voltage; and
    plural summing means each receiving said first output, a respective second voltage and a respective phase difference voltage to produce a respective algebraically summed voltage which is applied to energize the servo amplifier in control of the respective motors.

11. Circuit apparatus as set forth in claim 10 wherein said means generating a reference frequency signal includes:
    a variable frequency oscillator generating said reference frequency signal;
    a frequency to voltage converter producing said first output; and
    a frequency divider producing said second output.

12. Circuit apparatus as set forth in claim 10 wherein each of said plural means responsive to respective motor driven rotary air modulation elements comprise:
    shaft encoder means receiving rotation in synchronism with the respective rotary air modulation element and producing respective first and second feedback signals.

13. Circuit apparatus as set forth in claim 11 wherein each of said plural means responsive to respective motor driven rotary air modulation elements comprise:
    shaft encoder means receiving rotation in synchronism with the respective rotary air modulation element and producing respective first and second feedback signals.

14. Circuit apparatus as set forth in claim 10 which is further characterized in that:
    each of said motors is a hydraulic motor driven in response to a hydraulic drive system with servo valve control.

15. Circuit apparatus as set forth in claim 14 which further includes:
    plural pressure transducer means each sensing fluctuations in a respective hydraulic motor pressure to generate a respective correction voltage for further input and summation in each respective one of said plural summing means.

16. Circuit apparatus as set forth in claim 15 wherein each of said means responsive to a respective motor driven rotary air modulation element comprises:
    shaft encoder means receiving rotation in synchronism with the respective rotary element and producing the respective first and second feedback signals.

17. Circuit apparatus as set forth in claim 10 wherein said means generating a reference frequency signal comprises:
    an internal reference generator;
    an external reference generator; and
    means controllable to switch between internal and external reference generators to provide said reference frequency signal first output and second output.

18. Circuit apparatus as set forth in claim 17 wherein said means controllable comprises:
    means for generating a sweep true signal; and
    logic means responsive to said sweep true signal to switch from said internal reference generator to said external reference generator to enable precise control of said rotary air modulation elements.

19. Circuit apparatus for controlling angular velocity and angular position of a motor driven rotary element which includes a servo amplifier controlling said motor, comprising:

means generating a pre-set reference frequency and providing an angular velocity output and an angular position output;

shaft encoder means driven in synchronism with said rotary element and generating a first output and a sub-multiple frequency second output;

converter means receiving said first output and providing an angular velocity error output;

phase detector means receiving said second output and angular position output to provide an angular position error output; and means for summing said angular velocity output, said angular velocity error output and said angular position error output to provide drive output to said servo amplifier controlling said motor.

20. Circuit apparatus as set forth in claim 19 which is further characterized to include:

means sensing drive power to said motor to generate an angular acceleration output for input to said means for summing.

21. Circuit apparatus as set forth in claim 19 wherein: said reference frequency is an integral multiple of the motor driven rotary element angular velocity.

22. Circuit apparatus as set forth in claim 20 wherein: said reference frequency is an integral multiple of the motor driven rotary element angular velocity.

23. Circuit apparatus as set forth in claim 22 wherein: said shaft encoder means first output frequency is an integral multiple of said rotary element angular velocity, and said shaft encoder means second output frequency is an integral sub-multiple of said rotary element angular velocity.

* * * * *